(12) United States Patent
Mathews et al.

(10) Patent No.: US 7,733,888 B2
(45) Date of Patent: Jun. 8, 2010

(54) POINTER ALLOCATION BY PRIME NUMBERS

(75) Inventors: Gregory S. Mathews, Santa Clara, CA (US); Sanjay Jain, Saratoga, CA (US); Jorge Alejandro Aguilar, Santa Clara, CA (US); Avinash Mani, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1688 days.

(21) Appl. No.: 10/443,586

(22) Filed: May 22, 2003

(65) Prior Publication Data
US 2003/0235189 A1 Dec. 25, 2003

Related U.S. Application Data

(60) Provisional application No. 60/385,985, filed on Jun. 4, 2002.

(51) Int. Cl.
*H04L 12/50* (2006.01)
*H04L 12/28* (2006.01)
(52) U.S. Cl. .................. 370/412; 370/379; 370/382; 370/395.7; 370/413
(58) Field of Classification Search .......... 370/412, 370/413, 395.7, 379, 382
See application file for complete search history.

(56) References Cited

U.S. PATENT DOCUMENTS

| | | | | |
|---|---|---|---|---|
| 5,699,388 A * | 12/1997 | Wang et al. ............... 375/356 |
| 5,881,380 A * | 3/1999 | Mochizuki et al. ......... 707/102 |
| 6,021,132 A | 2/2000 | Muller et al. .............. 370/412 |
| 6,088,745 A * | 7/2000 | Bertagna et al. ............ 710/56 |
| 6,097,815 A * | 8/2000 | Shimada .................... 380/46 |
| 6,233,244 B1 * | 5/2001 | Runaldue et al. ........... 370/412 |
| 6,449,695 B1 * | 9/2002 | Bereznyi et al. ........... 711/134 |
| 6,490,611 B1 * | 12/2002 | Shen et al. ................. 718/103 |
| 6,563,818 B1 * | 5/2003 | Sang et al. ................. 370/379 |
| 6,618,390 B1 * | 9/2003 | Erimli et al. ............... 370/412 |
| 6,807,619 B1 * | 10/2004 | Ezra et al. .................. 711/219 |
| 6,862,639 B2 * | 3/2005 | Chirco et al. ............... 710/112 |
| 6,985,486 B1 * | 1/2006 | Agrawal ................... 370/395.1 |
| 7,031,331 B2 * | 4/2006 | Schaub ..................... 370/412 |
| 7,058,065 B2 * | 6/2006 | Musoll et al. .............. 370/395.7 |
| 7,209,440 B1 * | 4/2007 | Walsh et al. ............... 370/230 |
| 7,321,554 B1 * | 1/2008 | Walsh et al. ............... 370/230 |
| 2001/0028652 A1 * | 10/2001 | Sakurai et al. ............. 370/395 |
| 2002/0032829 A1 * | 3/2002 | Dalrymple ................. 711/5 |
| 2003/0081612 A1 * | 5/2003 | Goetzinger et al. ........ 370/395.21 |
| 2003/0172202 A1 * | 9/2003 | Chirco et al. ............... 710/22 |
| 2004/0057376 A1 * | 3/2004 | Sasvari et al. .............. 370/230 |
| 2004/0117578 A1 * | 6/2004 | Castelli et al. ............. 711/170 |
| 2004/0131055 A1 * | 7/2004 | Calderon et al. ........... 370/381 |
| 2006/0056436 A1 * | 3/2006 | Horikawa .................. 370/412 |

(Continued)

*Primary Examiner*—Kwang B Yao
*Assistant Examiner*—Jutai Kao
(74) *Attorney, Agent, or Firm*—Wilson & Ham

(57) ABSTRACT

A prime number based pointer allocation technique. A packet-forwarding system incorporating the technique stores cells of a packet in packet memory, according to allocated pointers that have a fixed correspondence to locations in the packet memory. Each packet input interface of an ingress module has a memory parameter counter that is incremented by a different prime number each time a memory pointer is allocated to that input interface. The memory parameter counter includes a memory interface portion and a memory bank portion that correspond to the memory interfaces and memory banks of a packet memory with which the memory pointers are associated.

16 Claims, 4 Drawing Sheets

U.S. PATENT DOCUMENTS

2006/0077995 A1* 4/2006 Lenell ..................... 370/412
2006/0187963 A1* 8/2006 Basso et al. ................ 370/474
2007/0067511 A1* 3/2007 Khawand et al. ............. 710/52
2007/0223482 A1* 9/2007 Wyatt ..................... 370/392

* cited by examiner

300 ⟶

| | Sequence | Interface | Bank |
|---|---|---|---|
| Increment | 1 | 00 | 00 |
| 0101 | 2 | 01 | 01 |
| | 3 | 10 | 10 |
| | 4 | 00 | 11 |
| | 5 | 10 | 00 |
| | 6 | 00 | 01 |
| | 7 | 01 | 10 |
| | 8 | 10 | 11 |
| | 9 | 01 | 00 |
| | 10 | 10 | 01 |
| | 11 | 00 | 10 |
| | 12 | 01 | 11 |
| | 1 | 00 | 00 |
| | 2 | 01 | 01 |

306 — Increment
302 — Interface
304 — Bank

POINTER ALLOCATION BY PRIME NUMBERS

CROSS REFERENCE TO RELATED APPLICATION

This application is entitled to the benefit of provisional Patent Application Ser. No. 60/385,985, filed 4 Jun. 2002.

FIELD OF THE INVENTION

The present invention relates generally to packet-based traffic forwarding, and more particularly to assigning a list of pointers to a packet in a packet-based traffic forwarding system.

BACKGROUND OF THE INVENTION

Packet-switched networks are responsible for forwarding packet-based traffic. In some hardware devices, such as switches and routers, packets are broken into fixed-length cells and forwarded from an ingress module, across a switching fabric, to an egress module, where the cells are typically reassembled into packets. While awaiting transmission from the ingress module to the fabric, from the fabric to the egress module, reassembly in the egress module, etc., a packet, broken into cells, may be temporarily stored/buffered in memory. Additionally, the packet, broken into cells, may be represented by a list of pointers that correspond to the one or more memory locations occupied by the one or more cells of that packet.

However, while the cells of packets are being read from or written to memory it is possible for memory resource conflicts or memory resource oversubscription to occur. A way to improve performance is to minimize memory resource conflicts and oversubscription. For example, some memories, such as DRAM incur a time penalty for accesses to the same interface and bank that are not on the same row. Minimizing resource conflicts and time penalties is an on-going optimization problem.

In view of the desire to minimize resource conflicts and time penalties, what is needed is a pointer allocation scheme that reduces conflicts. It would be further desirable to distribute memory reads and memory writes across packet memory interfaces and packet memory banks so that no interface or bank goes under- or over-utilized.

SUMMARY OF THE INVENTION

A technique for improving performance in a packet-forwarding system involves receiving packet data, or cells, and storing the cells in packet memory, according to allocated pointers that have a fixed correspondence to locations in the packet memory so as to facilitate operations on the cells.

To minimize conflicts and maximize memory bandwidth, an ingress module utilizes a prime number based pointer allocation scheme. In an embodiment, each packet input interface of the ingress module has a memory parameter counter that is incremented by a prime number each time a memory pointer is allocated to that input interface. In an embodiment, the memory parameter counter includes a memory interface portion and a memory bank portion. The memory interface portion and memory bank portion correspond to the memory interfaces and memory banks of a packet memory with which the memory pointers are associated. In addition, each input interface counter is made to increment by a different prime number, so that the probability that cells from the input interfaces will continually access the same memory interface/bank is minimized and memory bandwidth is maximized. Additionally, when packets are read back from the memory, read conflicts are minimized because the packet retrieval pointers are prime number sequences. Moreover, by using prime numbers, it is assured that each input interface will evenly distribute its reads/writes across all memory interfaces/banks so that none will go under-utilized.

A method for configuring a system to assign pointers to packets according to an embodiment of the invention includes providing pointer buffer fields configured to identify memory interfaces and memory banks associated with a pointer memory, associating respective unique prime number values with the pointer buffer fields, configuring input interfaces to obtain a pointer of the pointer memory in accordance with a pointer buffer field of the pointer buffer fields, store a received packet in accordance with the pointer, and increment the pointer buffer field by the respective prime number value associated with the pointer buffer field.

A method for forwarding packets according to an embodiment of the invention includes assigning a first pointer from an available pool of pointers to a first cell in accordance with a first memory parameter, storing the first cell in memory according to the first pointer, incrementing the first memory parameter by a first prime number, and returning the first pointer to the available pool of pointers.

A packet based-traffic forwarding system that allocates pointers to memory blocks according to an embodiment of the invention includes packet memory, pointer memory, a sorting buffer, a pointer buffer, one or more input interfaces, and an output interface. The pointer memory is configured to contain a list of pointers that are associated with locations of the packet memory, wherein the list of pointers includes a list of available pointers. The sorting buffer is configured to sort available pointers of the list of available pointers in accordance with memory parameters. The pointer buffer is configured to contain the sorted pointers. The input interfaces are configured to receive cells for storage in the packet memory. The input interfaces include a prime number memory parameter increment engine configured to increment a memory parameter counter by a prime number and a pointer acquisition engine configured to receive pointers from the pointer buffer in accordance with the memory parameter counter, and to associate the pointers with the cells. The output interface is configured to forward the cells from the packet memory and return the associated pointers to the list of available pointers.

Exemplary figures illustrate embodiments of the invention that illustrate methods and systems for pointer allocation by primes. Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 3 is an illustration of a prime number increment of a counter over time in accordance with an embodiment of the invention.

DETAILED DESCRIPTION OF THE INVENTION

Figure 1:
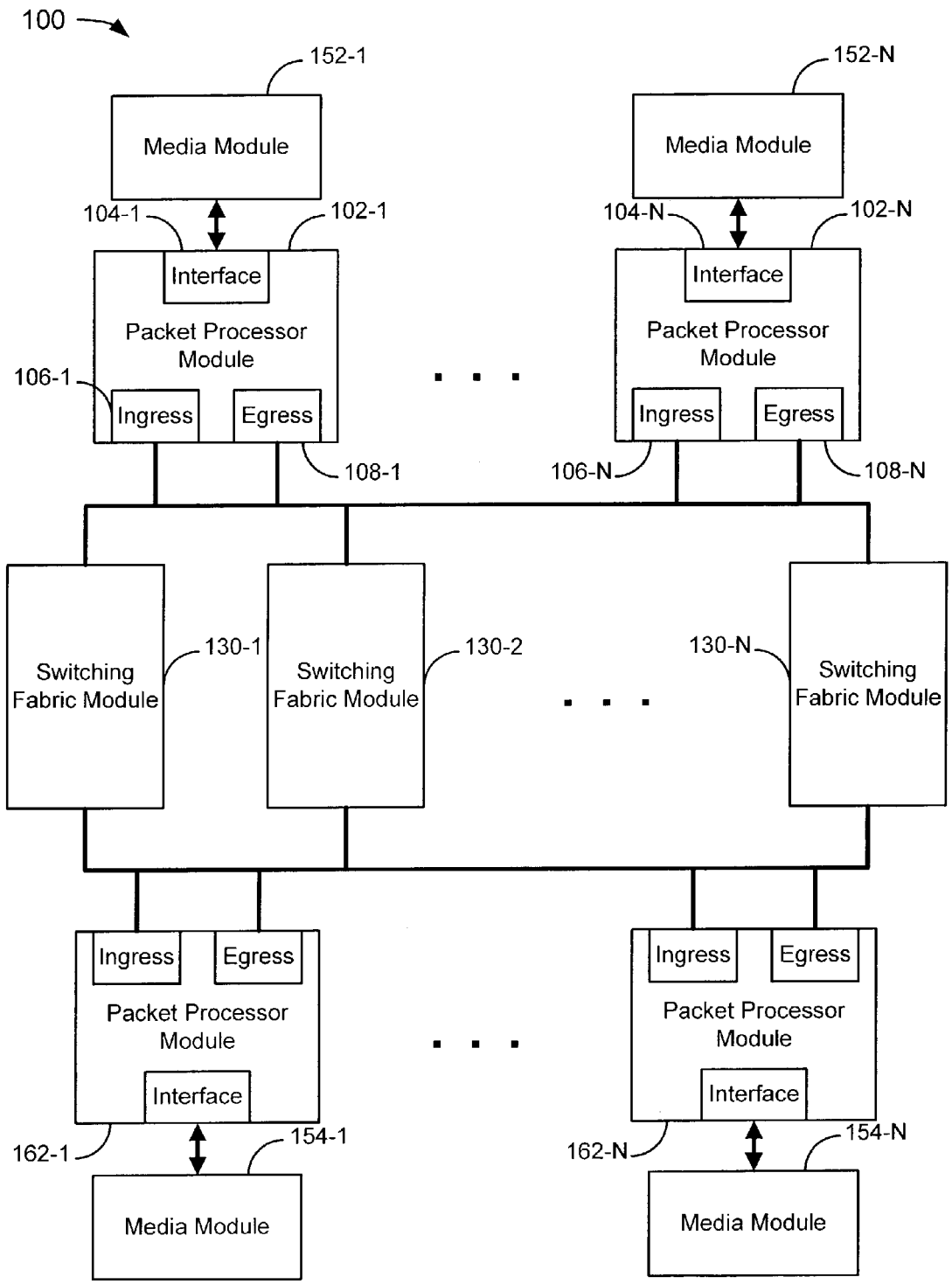
FIG. 1 is a block diagram of a traffic forwarding system in accordance with an embodiment of the invention.

As shown in the drawings for the purposes of illustration, an embodiment of the invention is a system for assigning pointers for cells to optimize memory accesses.

FIG. 1 is a block diagram of a traffic forwarding system 100 in accordance with an embodiment of the invention. The system 100 includes media modules 152-1 to 152-N and 154-1 to 154-N, packet processor modules 102-1 to 102-N (referred to collectively as the packet processor modules 102) and 162-1 to 162-N (referred to collectively as the packet processor modules 162), and switching fabric modules 130-1 to 130-N (referred to collectively as the switching fabric modules 130). The media modules 152-1, 152-N, 154-1, and 154-N are respectively coupled to the packet processor modules 102-1, 102-N, 162-1, and 162-N. It should be noted that each packet processor module may be coupled to two or more media modules (not shown). The packet processor modules 102 and 162 are coupled to the switching fabric modules 130. The switching fabric modules 130 include circuitry to replicate cells by writing to multiple buffers. This functionality may be used with multicast cells that target a plurality of destinations. The packet processor module 102-1 includes an interface module 104-1 for forwarding packets to and from the media module 152-1, an ingress module 106-1 for forwarding cells to the switching fabric modules 130, and an egress module 108-1 for receiving cells from the switching fabric modules 130. The packet processor modules 102 and 162 have comparable components and couplings. In an embodiment, the interface modules 104 are configured to receive packets. If a packet is too large to fit in a single cell, it is broken into portions and each portion is encapsulated in a separate cell. In an embodiment, the system 100 is an Ethernet switch or an Ethernet router that forwards traffic within the system 100 using Layer 2, Layer 3, and/or Layer 4 header information. The system 100 may include line cards that support network protocols such as Ethernet, ATM, and Frame Relay. Although an Ethernet-based switch/router is described, the disclosed pointer allocation techniques can be applied to any traffic-forwarding system.

When packets are received at the ingress module 106, cells that make up the packet are typically written to a packet memory and operations related to the cells, such as queuing the cells according to traffic class or destination, are performed using pointers to the cells. In this way, cells are written to packet memory only once and read only when it is time to forward the cells to the switching fabric modules 130. In the ingress module 106, the packets, and typically the cells that make up the packets, are stored in a packet memory, such as a dynamic random access memory (DRAM). Memory interfaces facilitate access to blocks of packet memory in which packets are stored using pointers to the blocks of packet memory.

In an embodiment, before being allocated, the pointers may be stored in a buffer of available memory pointers partitioned according to which memory bank and interface the pointers correspond. As packets are received at the ingress module 106, pointers are retrieved from the available pointer buffers and data associated with the packets is broken into cells and stored in the memory locations described by the pointers. Thus, while stored in the ingress module 106, a packet may be described by a list of pointers. When the packet is forwarded from the ingress module 106 to the switching fabric module 130, the list of pointers is then returned to the available pointer buffer.

Figure 2:
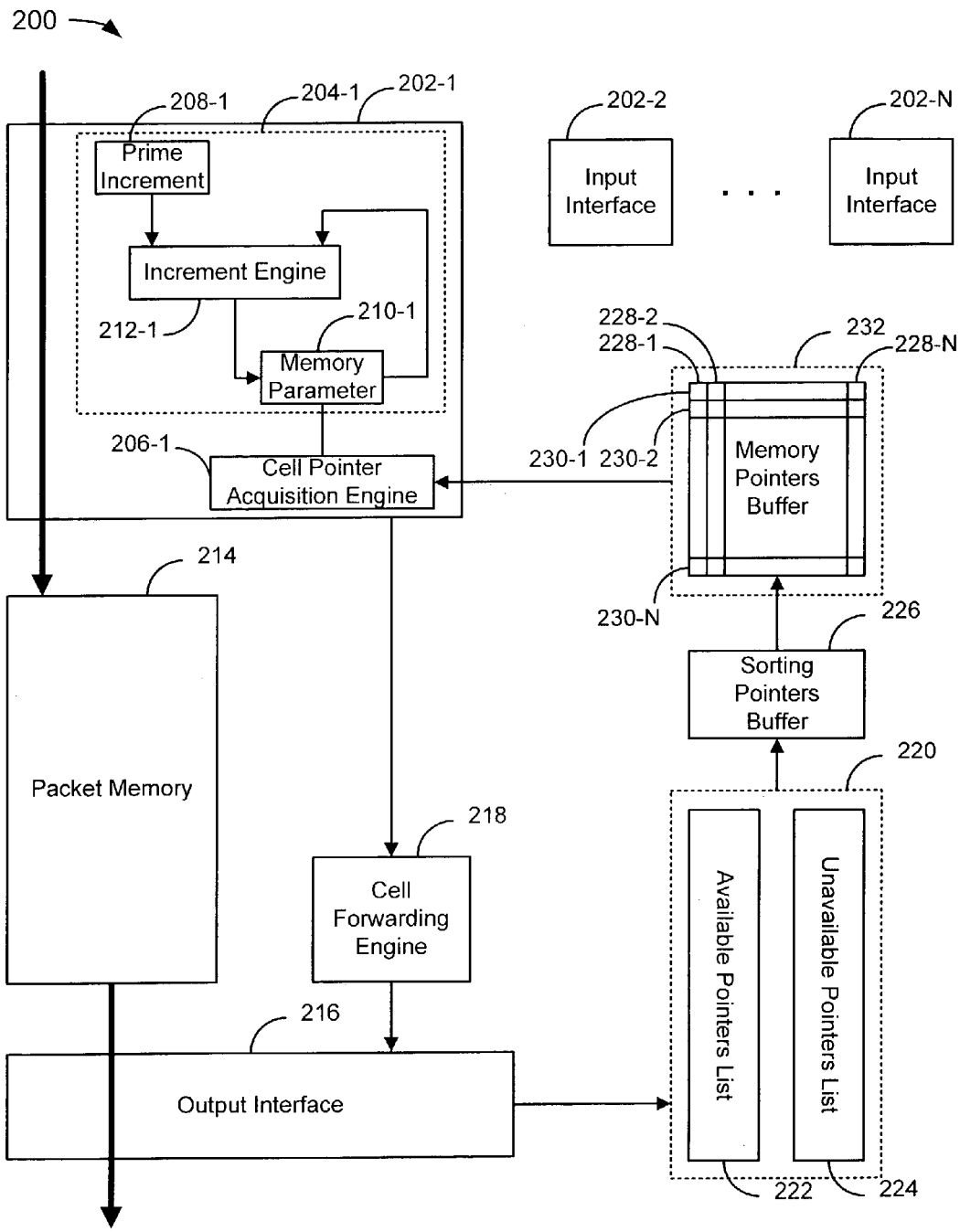
FIG. 2 is a block diagram of an ingress module for use with the system of FIG. 1 in accordance with an embodiment of the invention.

FIG. 2 is a block diagram of an ingress module 200 for use with the system 100 (FIG. 1) in accordance with an embodiment of the invention. The ingress module 200 is analogous to the ingress module 106 (FIG. 1). The ingress module 200 includes a plurality of input interfaces 202-1 to 202-N (referred to collectively as input interfaces 202), packet memory 214, an output interface 216, a cell forwarding engine 218, pointer memory 220, a sorting pointers buffer 226, and a memory pointers buffer 232. The input interface 202-1 includes a prime number memory parameter increment engine 204-1 and a cell pointer acquisition engine 206-1. The prime number memory parameter increment engine 204-1 includes a prime increment field 208-1, a memory parameter field 210-1, and an increment engine 212-1. In an embodiment, the prime increment field 208-1 and memory parameter field 210-1 are registers. The input interfaces 202-2 to 202-N have similar components (not illustrated). The memory pointers buffer 232 is organized into columns 228-1 to 228-N, which may also be referred to as sub-buffers 228-1 to 228-N (collectively referred to as sub-buffers 228), each with rows 230-1 to 230-N. The number of rows 230-1 to 230-N determines the depth of the memory pointers buffer 232. The pointer memory 220 includes an available pointer list 222 and an unavailable pointer list 224.

In an embodiment, when a cell is received on one of input interfaces 202, the cell is assigned a pointer and is written to the packet memory 214 in accordance with the pointer. In an embodiment, the packet memory 214 is a DRAM. Accordingly, the pointer is associated with a DRAM location. In an embodiment, the cell is written to the packet memory 214 only once. Later, the cell is read from the packet memory 214 and output via the output interface 216. In an embodiment, the cell is read from the packet memory 214 only once. While the cell is stored in the packet memory 214, the assigned pointer is used to perform cell-forwarding operations related to the cell, such as arbitration. This is why the cell need only be written to and read from the packet memory 214 one time.

In an embodiment, the pointers are stored in the pointer memory 220. In an alternative, the pointer memory 220 is an on-chip cache that contains a list of pointers to locations of the packet memory 214. The pointers stored in the pointer memory 220 may be stored in the available pointers list 222 or the unavailable pointers list 224. The available pointers list 222 contains pointers to packet memory locations that do not contain current packet information. The unavailable pointers list 224 contains pointers to packet memory locations that contain current packet information (e.g., cells are stored in these memory locations awaiting forwarding). Initially, the unavailable pointers list 224 should be empty and the available pointers list 222 should contain every pointer to locations of the packet memory 214. When a pointer is assigned to a cell received on one of the input interfaces 202, the pointer is moved from the available pointers list 222 to the unavailable pointers list 224. It should be noted that in an alternative embodiment, the pointer could instead be moved from the available pointers list 222 to the unavailable pointers list 224 when the pointer is placed in the memory pointers buffer 232 (as described later). When the cell is forwarded via the output interface 216, the pointer associated with the cell is moved from the unavailable pointers list 224 back to the available pointers list 222.

In an embodiment, the available pointers list 222 is a linked list of pointers, with a head and a tail. When a pointer from the unavailable pointers list 224 is moved back to the available pointers list 222, it is enqueued at the tail. When the sorting pointers buffer 226 can receive a pointer, a pointer at the head of the available pointers list 222 is dequeued and placed in the sorting pointers buffer 226. In an embodiment, the sorting pointers buffer 226 can receive a pointer if the sorting pointers buffer 226 is not full and the available pointers list 222 is not empty. A pointer in the sorting pointers buffer 226 is placed into the memory pointers buffer 232 in one of the sub-buffers 228 that corresponds to the memory parameters of the pointer. In an embodiment, the memory parameters include a memory interface parameter and a memory bank parameter. In an alternative, there are 3 memory interfaces and 4 memory banks. In another alternative, there are 12 memory parameter values (e.g., 3 memory interfaces times 4 memory banks). With this alternative, there are 12 sub-buffers 228 in the memory pointers buffer 232. In an embodiment, there are 64 rows 230 in the memory pointers buffer 232. Accordingly, up to 64 pointers may be placed in each of the sub-buffers 228. When a cell is assigned a pointer from the appropriate one of sub-buffers 228, the pointer is removed from the sub-buffer.

In an embodiment, a corrective procedure ensures that a pointer is available regardless of whether a pointer with the appropriate memory parameters is available. For example, if a first sub-buffer of the sub-buffers 228 becomes empty, a pointer may be selected from a second sub-buffer that is not empty, regardless of the value of the memory parameters for the second sub-buffer. Alternatively, if a first sub-buffer is empty or is running out of pointers, the corrective procedure may include sorting pointers at the sorting pointers buffer 224 into either the first empty (or near-empty) sub-buffer or, if no sub-buffers are empty (or near-empty), a second sub-buffer in accordance with memory parameters associated with the pointers. Or, if a first sub-buffer is empty or is running out of pointers, the corrective procedure may include sorting pointers at the sorting pointers buffer 224 into a first empty (or near empty) sub-buffer in accordance with the memory parameters associated with the pointer, or, if the first sub-buffer associated with the memory parameters of the pointer is not empty (or near empty), a second sub-buffer that is empty (or near empty), or if a second sub-buffer is not empty (or near empty), a third sub-buffer in accordance with memory parameters associated with the pointer. It should be noted that the corrective procedure may result in less efficient memory accesses, but without the corrective procedure, it is possible that a sub-buffer would run dry, meaning a pointer could not be assigned to a cell requesting a pointer with the memory parameters of the sub-buffer. This could lead to wasted resources as the cell is held up while it waits for the sub-buffer to receive a pointer, or even deadlock in some cases. In an embodiment, a pointer is never added to a buffer that is full.

When a first cell is received at an input interface 202-1, for example, the cell pointer acquisition engine 206-1 selects a pointer from the memory pointers buffer 232. The pointer is selected from a memory pointers sub-buffer 228, in accordance with the value of the memory parameters field 210-1. If a pointer is not available because, for example, the memory pointers buffer 232 is empty or no pointer is available from the memory sub-buffer 228 selected according to the value of the memory parameters field 210-1, then the input interface 202-1 will stall until a pointer becomes available. After selecting the pointer and associating it with the first cell, the increment engine 212-1 increments the memory parameter field 210-1 by the value of the prime increment field 208-1. In an embodiment, to increment engine 212-1 rolls over the value of the memory parameter field 210-1 if the increment yields a value that is higher than the predetermined number of memory parameter sequences. This is described below with reference to FIG. 3. The value of the prime increment field 208-1 is a prime number that is unique vis-à-vis prime increment fields associated with each of the other input interfaces 202-2 to 202-N. Moreover, a prime number is not considered unique if a remainder obtained by dividing the value of the prime increment field 208-1 by a pre-determined number of memory parameter sequences, is equal to the value of a prime increment field associated with any of the other input interfaces 202-2 to 202-N. The rationale for this is described below with reference to FIG. 3.

FIG. 3 is an illustration 300 of a prime number increment of a counter over time in accordance with an embodiment of the invention. The illustration 300 includes a memory interface field 302, a memory bank field 304, and an increment field 306. The memory interface field 302 and the memory bank field 304 together make up a memory parameter field, such as the memory parameter field 210-1 (FIG. 2). The value of the increment field 306 is added to the memory parameter field, yielding a new sequence with each increment. In the illustration 300, the memory interface field 302 may have a value of '00', '01', or '10'. The memory interface field does not have a value of '11' in any sequence. The memory interface field 302 only has three possible values because there are only three memory interfaces in the exemplary embodiment of FIG. 3. Accordingly, the interface field 302 rolls over to '00' after '10', rather than incrementing to '11'. In the exemplary embodiment of FIG. 3, the memory bank field 304 has up to four possible values. Accordingly, the memory bank field 304 may be represented with two bits without rollover (other than the usual rollover from '11' to '00'). Since the memory interface field 302 has three possible values and the memory bank field has four possible values, there are a total of 12 possible memory parameter sequences. As shown in the illustration 300, the sequences should repeat after 12 increments. This is true for any prime number increment field 306. It should be noted that if a first memory parameter is incremented by a first increment field and a second memory parameter is incremented by a second increment field, the increment fields would have to be different to ensure that the memory parameters would not track one another. For example, if the first and second increment fields are both 5, the first and second memory parameter sequences may track one another for a period of time, resulting in less efficient memory accesses when using pointers having the memory parameter sequence. Also, in the case of 12 possible memory parameter sequences, the remainder of the first increment field divided by 12 should not equal the second increment field. The rationale is similar to the rationale for ensuring the first and second increment fields are different: the first and second memory parameter sequences may track one another for a period of time.

Figure 4:
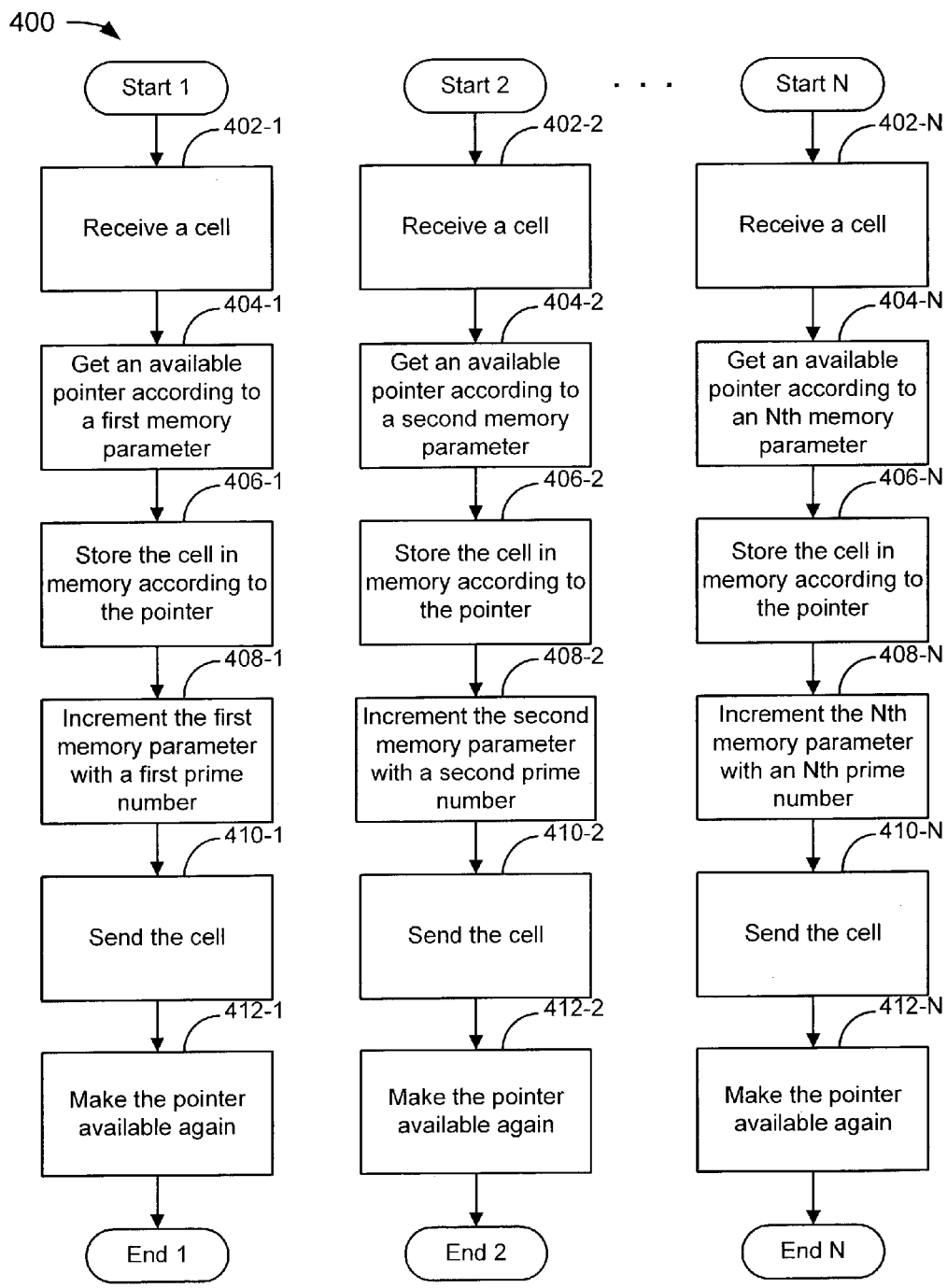
FIG. 4 is a flowchart of a method according to an embodiment of the invention.

FIG. 4 is a flowchart 400 of a method according to an embodiment of the invention. The flowchart 400 is intended to illustrate a method of storing cells in a memory-efficient manner by selecting pointers with optimally variable memory parameters. The flowchart 400 starts at a plurality of starting points, start 1 to start N, which are the start of flow 1 to flow N and ends at a plurality of ending points, end 1 to end N. The flows 1 to N represent one cycle of receiving a cell, storing the cell in accordance with a pointer, sending the cell, and making the pointer available again. For flow 1, a cell is received at step 402-1, an available pointer is acquired according to a first memory parameter at step 404-1, the cell is stored in memory according to the pointer at step 406-1, the first memory parameter is incremented by a first prime number at step 408-1, the cell is sent at step 410-1, the pointer is made available again at step 412-1, and flow 1 ends at end 1. Flows 2 to N are similar to flow 1. However, for each of the flows, the prime numbers are different. Thus, while the first memory parameter and the second memory parameter, for example, may be identical at step 404-1 and 404-2, since the first prime number and second prime number are not the same, the first memory parameter and second memory parameter are unlikely to be identical at step 408-1 and 408-2. In other words, the memory parameters do not track one another for the flows 1 to N. It should be noted that multiple active iterations of each of the flows 1 to N are possible. For example, a first cell may be received at step 402-1, then a second cell may be received at step 402-1 before the first cell is sent at step 410-1, but not before the memory parameter is incremented at step 408-1.

In one embodiment, the method steps described above are embodied in a computer-readable media as computer instruction code. It shall be appreciated that not all methods steps described must be performed, nor must they be performed in the order stated.

The term packet is defined broadly to include fixed-length cells, variable length packets, and encapsulated data. A packet could be broken into a plurality of smaller cells. As used herein, the term packet could refer to a flow of the plurality of cells or a single cell of such a flow.

Although specific embodiments of the invention have been described and illustrated, the invention is not to be limited to the specific forms or arrangements of parts as described and illustrated herein. The invention is limited only by the claims.

What is claimed is:

1. A method for configuring a system to assign pointers to packets, comprising:
    configuring a pointer memory of an ingress module of a traffic forwarding system to contain a linked list of available pointers with a head and a tail and a list of unavailable pointers;
    sorting available pointers by memory interface parameters and memory bank parameters associated with said packet memory;
    providing a plurality of pointer buffer fields in a memory pointers buffer, where said pointer buffer fields comprises a plurality of sub-buffers, wherein each sorted pointer is placed into one of the sub-buffers corresponding to a memory parameter of said sorted pointer comprising a memory interface parameter and a memory bank parameter;
    associating respective prime number values with said plurality of pointer buffer fields, wherein said respective prime number values are unique; and
    configuring a plurality of input interfaces to:
        obtain a pointer of said packet memory from a sub-buffer of said plurality of pointer buffers fields in accordance with a memory parameter field of a prime number memory parameter increment engine configured as a counter and comprising two values as a memory parameter field sequence, where a first value is contained in a memory interface field register and a second value is contained in a memory bank field register;
        store a received packet in a packet memory in accordance with said pointer; and
        increment said counter by adding a unique prime number to said two values of said counter to yield a new memory parameter field sequence.

2. The method of claim 1, further comprising:
    maintaining said first value of said memory parameter field that identifies said memory interface parameter of said packet memory; and
    maintaining said second value of said memory parameter field that identifies said memory bank parameter of said packet memory.

3. The method of claim 1, further comprising:
    configuring an output interface of said ingress module to forward said packet and recycle said pointer.

4. The method of claim 1, further comprising:
    establishing a product of a number of said memory interfaces times a number of said memory banks; and
    establishing said respective prime number values such that the remainder of a first respective prime number value divided by said product does not equal any second respective prime number value.

5. A method for forwarding packets, comprising:
    assigning a first pointer from an available pool of pointers to a first cell in accordance with a first memory parameter field of a prime number memory parameter increment engine, wherein the prime number memory parameter increment engine is located within an ingress module of a traffic forwarding system;
    moving said first pointer in a pointer memory from a linked list of available pointers with a head and a tail to a list of unavailable pointers;
    storing the first cell in memory according to said first pointer;
    incrementing said first memory parameter field by a first prime number; and
    moving said first pointer in said pointer memory from said list of unavailable pointers to said linked list of available pointers, wherein said first pointer is enqueued at said tail.

6. The method of claim 5, further comprising:
    receiving a second cell on a second interface;
    assigning a second pointer from said available pool of pointers to said second cell in accordance with a second memory parameter field of said prime number memory parameter increment engine;
    moving said second pointer from said linked list of available pointers to said list of unavailable pointers;
    storing the second cell in memory according to said second pointer;
    incrementing said second memory parameter field by a second prime number;
    forwarding said second cell on said output interface; and
    moving said second pointer from said list of unavailable pointers to said linked list of available pointers, wherein said second pointer is enqueued at said tail.

7. The method of claim 6, further comprising:
    ensuring that a remainder of said first prime number divided by a number of memory parameters is not equal to said second prime number.

8. The method of claim 5, wherein said first memory parameter field comprises a memory interface field register that has a value between 0 and a represented number of memory interfaces, further comprising:
    rolling over said first memory parameter field when said first memory parameter field is incremented such that a first memory interface field register has a value greater than a represented number of memory interfaces.

9. The method of claim 5, further comprising:
    receiving said first cell on a first input interface; and
    forwarding said first cell on an output interface.

10. A packet based-traffic forwarding system that allocates pointers to memory blocks, comprising:
    packet memory;

pointer memory configured to contain a linked list of available pointers with a head and a tail and a list of unavailable pointers;

a sorting buffer configured to receive and to sort available pointers of said list of available pointers in accordance with memory parameters, wherein said memory parameters include memory interface parameters and memory bank parameters associated with said packet memory;

a pointer buffer configured to contain the sorted pointers, where said pointer buffer comprises a plurality of sub-buffers, wherein each sorted pointer is placed into one of said sub-buffers corresponding to a memory parameter of said sorted pointer comprising a memory interface parameter and a memory bank parameter;

one or more input interfaces configured to receive cells for storage in said packet memory, said one or more input interfaces including:

a prime number memory parameter increment engine configured to increment a memory parameter counter by a prime number, said prime number memory parameter increment engine comprising a prime increment field register containing the value of a unique prime number, a memory parameter field configured as said counter and comprising two values as a memory parameter field sequence, where a first value is contained in a memory interface field register and a second value is contained in a memory bank field register, and an increment engine configured to increment said counter by adding said unique prime number to said two values of said counter to yield a new memory parameter field sequence with each increment;

a pointer acquisition engine configured to select and remove pointers from a sub-buffer, to receive the selected pointers, and to associate the received pointers with said cells, where each said selection is made in accordance with said new memory parameter field of said prime number memory parameter increment engine; and an output interface configured to forward said cells from said packet memory and return said associated pointers to said linked list of available pointers, wherein said associated pointers are enqueued at said tail.

11. The system of claim 10, wherein said memory bank field register is in a least significant bit portion of said counter and said memory interface field register is in a most significant bit portion of said counter, said increment engine further configured to roll over if incrementing increases the memory interface field register to above a predetermined number.

12. The system of claim 10, wherein said memory parameter counter is four bits long.

13. The system of claim 10, further comprising:

a cell forwarding engine configured to use said associated pointers to execute procedures related to said cells.

14. The system of claim 10, wherein:

said sorting buffer is further configured to sort said available pointers so that a pointer that is associated with a location of said packet memory that does not correspond to said memory parameter becomes associated with said memory parameter if said sub-buffer is at risk of becoming empty.

15. The system of claim 10, wherein said one or more input interfaces includes a first input interface and a second input interface, wherein the prime number memory parameter increment engine of said first input interface is incremented by a first prime number, wherein the prime number memory parameter increment engine of said second input interface is incremented by a second prime number, and wherein said second prime number is different from said first prime number.

16. The system of claim 15, wherein a remainder of said first prime number divided by a number of said memory parameters is not equal to said second prime number for any second input interface.

* * * * *